United States Patent [19]
Krueger et al.
[11] Patent Number: 4,505,868
[45] Date of Patent: Mar. 19, 1985

[54] APPARATUS FOR FORMING MAT OF ALIGNED FLAKE COMPOSITE WOOD MATERIAL WITH CONTINUOUS BAFFLES

[75] Inventors: Gordon P. Krueger, Hancock; Anders E. Lund; Roy D. Adams, both of Houghton, all of Mich.

[73] Assignee: Board of Control of Michigan Technological University, Houghton, Mich.

[21] Appl. No.: 621,886

[22] Filed: Jun. 19, 1984

Related U.S. Application Data

[63] Continuation of Ser. No. 365,622, Apr. 1, 1982, abandoned.

[51] Int. Cl.³ .............................................. B29D 3/02
[52] U.S. Cl. .................................. 264/108; 264/112; 198/382
[58] Field of Search ....................... 198/382, 532, 569; 425/81.1, 82.1, 83.1; 264/24, 108, 112; 100/153

[56] References Cited

U.S. PATENT DOCUMENTS 4,058,201 11/1977 Etzold ................................ 198/382

*Primary Examiner*—Joseph E. Valenza
*Assistant Examiner*—Dennis Williamson

[57] ABSTRACT

An apparatus is provided for forming a continuous loosely felted mat of wood flakes, the wood flakes being elongated and being aligned in mutually parallel relation and parallel to the longitudinal axis of the mat. The apparatus includes a conveyor having an upper surface adapted to support a mat of wood flakes and formers for continuously depositing wood flakes on the conveyor as it moves under the former. Also included are continuous lengths of baffle material positioned between the formers and the conveyor, and oriented so as to define parallel adjacent vertical planes, the planes being parallel to the direction of movement of the upper surface. The lengths of baffle material are positioned in closely spaced side-by-side relation and move with the upper surface beneath the formers as the loosely felted mat is formed and are adapted to cause the flakes to become aligned and to be held in alignment during formation of the mat.

3 Claims, 2 Drawing Figures

APPARATUS FOR FORMING MAT OF ALIGNED FLAKE COMPOSITE WOOD MATERIAL WITH CONTINUOUS BAFFLES

This application is a continuation of Ser. No. 365,622 filed April 1, 1982, now abandoned.

FIELD OF THE INVENTION

The invention relates to apparatus for use in making compressed wood particle products and more particularly an apparatus for use in forming loosely felted mats of wood flakes, the mats being adapted to be compressed to thereby form composite wood products.

BACKGROUND PRIOR ART

As set forth in the Lund et al. U.S. Pat. No. 4,241,133, issued Dec. 23, 1980 and assigned to the assignee of the present invention, it has been found to be desirable in the construction of compressed or composite wood particle products to employ wood flakes which are very thin and which have a length at least several times their width and to align the wood flakes in mutually parallel alignment and in alignment with the longitudinal axis of the product being produced. This produces a product having substantially improved strength characteristics in the direction of alignment of the wood flakes. The production of such compressed wood products formed from an assembly of wood particles first requires the formation of a loosely felted mat of such wood particles. The mat is then compressed to form a densified panel or board. One problem encountered in forming the loosely felted mat is that the alignment or orientation of the elongated wood flakes is made difficult because the wood flakes, which are very light and comparatively fragile, have to be handled en masse, and this has resulted in the clogging of the known machines that were tried for this purpose. Additionally, it has been difficult to produce mats of uniform thickness using prior art machines. Another problem in connection with handling and orienting the wood flakes has been that the flakes tend to be randomly oriented as they fall onto the mat and must be held in alignment as they are deposited.

Examples of prior art attempts to design suitable apparatus for forming mats of aligned wood strands are set forth in the Elmendorf U.S. Pat. No. 3,478,861, issued Nov. 18, 1969; the Elmendorf U.S. Pat. No. 3,220,743, issued Aug. 24, 1965; the Turner et al. U.S. Pat. No. 3,721,329, issued Mar. 30, 1973; the Urmanov U.S. Pat. No. 3,963,400, issued June 15, 1976; and Canadian Pat. No. 597,941, issued May 10, 1960.

Attention is also directed to the Hostettler U.S. Pat. No. 3,226,764, issued June 4, 1966; the Hostettler U.S. Pat. No. 3,070,838, issued Jan. 1, 1963; the Carlsson et al. U.S. Pat. No. 3,692,612, issued Sept. 19, 1972; the Paerels et al. U.S. Pat. No. 3,372,217, issued Mar. 5, 1968; the Axer et al. U.S. Pat. No. 3,824,058, issued July 16, 1974; and the Chapman U.S. Pat. No. 3,992,152, issued July 11, 1961.

SUMMARY OF THE INVENTION

The present invention relates to apparatus including improved means for forming a continuous loosely felted mat of elongated wood flakes adapted to be compressed to form a densified product and wherein the wood flakes are aligned in mutually parallel relation and parallel to the longitudinal axis of the elongated mat being formed.

More particularly, the invention includes apparatus for forming a continuous loosely felted mat of wood flakes, the mat being elongated and including a longitudinal axis, and the wood flakes being elongated and being aligned in mutually parallel relation and parallel to the longitudinal axis of the continuous mat. The apparatus includes a conveyor having an upper surface adapted to support a loosely felted mat of wood flakes thereon, and means for causing continuous movement of the conveyor as the loosely felted mat is formed. The apparatus also includes means for continuously depositing wood flakes on the upper surface such that the wood flakes are built up on the upper surface to form an elongated continuous loosely felted mat, and flake alignment means for causing the wood flakes deposited on the upper surface to assume an orientation parallel to the direction of movement of the conveyor and to maintain that parallel orientation as the mat thickness increases. The flake alignment means includes means defining continuous lengths of baffle material, the continuous lengths of baffle material being oriented so as to define parallel adjacent vertical planes parallel to the direction of the movement of the conveyor. Each length of baffle material includes a lower edge adapted to be positioned adjacent the conveyor, and the lengths of baffle material are positioned in closely spaced side-by-side relation and move with the upper surface as the loosely felted mat is formed.

Various other features and advantages of the invention will be apparent from the following description of a preferred embodiment, from the claims, and from the drawings.

Figure 1:
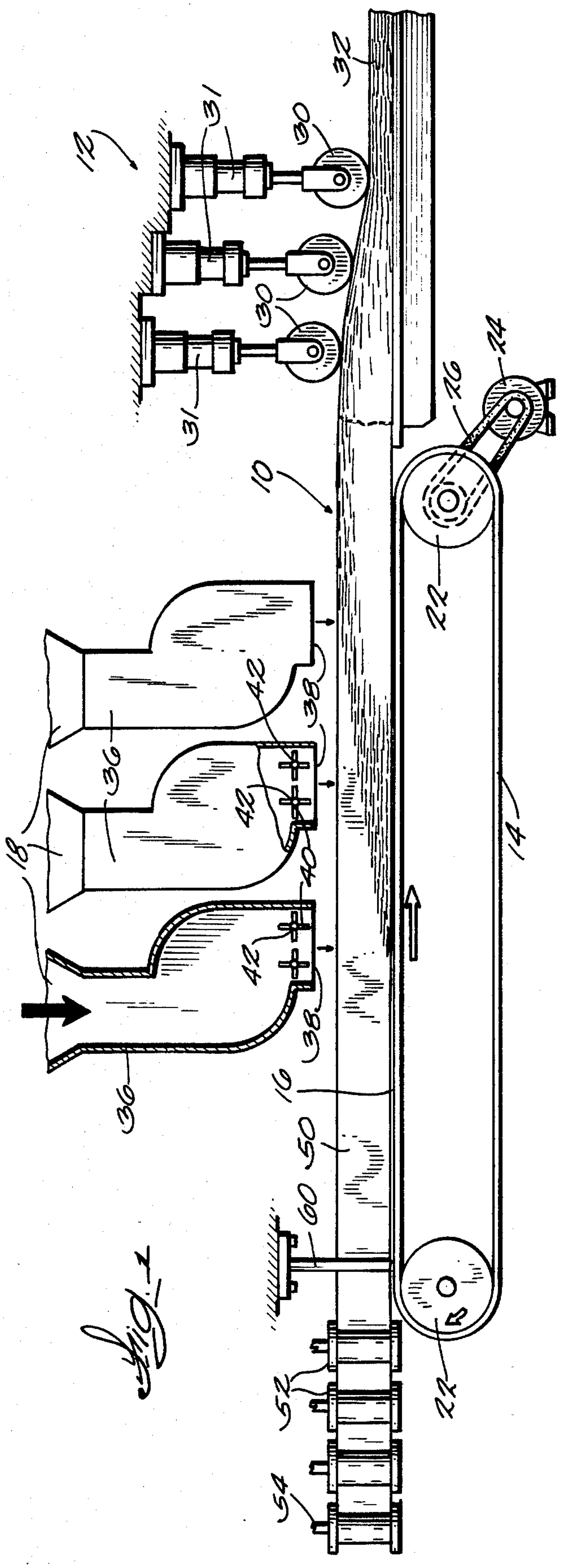
FIG. 1 is an elevation view of apparatus embodying the invention and with portions being broken away.

Before describing a preferred embodiment of the invention in detail, it is to be understood that the invention is not limited in it application to the details of construction nor to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Illustrated in FIG. 1 is an apparatus for use in forming a continuous loosely felted mat 10 of aligned wood flakes, the continuous mat 10 being adapted to be conveyed to a press apparatus 12 and to be compressed there to form a densified or compressed composite wood product of the type described in the Lund U.S. Pat. No. (4,241,133) referred to above.

As described in the Lund Patent, the composite wood products shown there are formed by first mixing wood flakes with a binder to form a furnish, the wood flakes being elongated and very thin as will be described in detail hereinafter. The wood flake furnish is formed by introducing flakes of a suitable size into a conventional blender wherein predetermined amounts of a binder are applied to the flakes as the flakes tumbled agitated in the blender.

The continuous loosely felted mat is formed by depositing the wood flakes mixed with a binder onto a suitable forming surface, the wood flakes being allowed to fall onto the forming surface in a loosely felted relation. Since the wood flakes are quite thin and generally flat, as they fall, they tend to orient themselves in a horizontal relation and in an interleaved arrangement.

The strength of the composite wood product being formed is dependent on the flake geometry, the relative orientation of the flakes, and on the binder employed in the furnish. In a preferred form of the invention, it has been found that the wood flakes should have an average length of about 0.5 inch to about 3.5 inches, preferably about 1 inch to about 2 inches, and an average thickness of about 0.01 to 0.05 inch, preferably about 0.015 to about 0.025 inch and most preferably about 0.02 inch. Flakes longer than about 3.5 inches tend to curl which hinders proper alignment during mat formation, and it is difficult to insure that flakes shorter than about 0.5 inch do not become aligned with their grain direction crosswise to the longitudinal direction of the product being formed. Flakes thinner than about 0.01 inch tend to require excessive amounts of binder to obtain adequate bonding, and flakes thicker than about 0.05 inch are relatively stiff and tend to require excessive compression to obtain the desired intimate contact therebetween. To facilitate proper alignment of the flakes in mutually parallel relation and parallel to the longitudinal axis of the mat being formed, the flakes should have a length which is several times their width, preferable about 4 to about 10 times. Using this constraint as a guide, the average width of the flakes should generally be about 0.1 to about 0.5 inch.

Suitable binders for use in the furnish include those used conventionally in the manufacture of particle board and similar pressed fiber products and other chemical bonding systems. Resinous particle board binders are preferred. Representative examples of suitable binders include thermosetting resins such as phenol-formaldehyde, urea-furfuryl and condensed furfuryl alcohol resins, and organic polyisocyanates including those curable at room temperatures, either alone or in combination with urea or melamine-formaldehyde resins.

The apparatus of the invention provides a means for handling wood flakes mixed with a binder and having the flake geometry as set forth above and provides for formation of the loosely felted mat 10 of the flakes with the flakes being aligned in mutually parallel relation and parallel to the longitudinal axis of the mat being formed. Referring more particularly to the apparatus of the invention, as illustrated in FIG. 1, that apparatus includes a conveyor belt 14 defining a supporting surface 16 adapted to support the wood flakes deposited by forming heads 18 during the formation or build-up of the loosely felted mat 10. The upper surface 16 of conveyor belt 14 is adapted to support the flakes as they are deposited and has sufficient strength to support the mat 10 such that the mat can be transferred to the press assembly 12 where the mat 10 can be compressed and densified to form a composite wood product 32.

Referring more particularly to the conveyor belt 14 for supporting the mat, in the illustrated construction it is supported by a pair of rollers 22. Means are also provided for driving at least one of the rollers 22 such that the upper flight of the conveyor belt 14 is driven from left to right as seen in FIG. 1. The means for driving the conveyor belt 14 can be conventional and is not shown in detail. In the illustrated arrangement it comprises a motor 24 drivingly connected to one of the rollers 22 by a pulley arrangement including a drive belt 26. The loosely felted mat of wood flakes is conveyed by movement of the upper flight of the conveyor belt 14 to the press assembly 12 wherein the loosely felted mat 10 is compressed by a plurality of press rollers 30 and subjected to heat, if required by the binder employed in the furnish, and to thereby form a densified composite wood product 32.

Means are also provided for depositing elongated wood flakes onto the upper supporting surface 16 of the conveyor as the upper flight of the conveyor 14 moves from left to right as seen in FIG. 1 so as to build up a loosely felted mat on the conveyor. While the means for depositing the wood flakes could have various constructions, in the illustrated arrangement it includes a plurality of forming heads 18 positioned above the supporting surface 16, the forming heads 18 being positioned in spaced relation along at least a portion of the length of the belt 14. The forming heads 18 are not shown in detail since they comprise conventional apparatus which is used, for example, in the production of conventional chip board or particle board. The forming heads 18 each include a container or hopper 36 for housing a quantity of wood flakes, the hopper 36 including an opening 38 in its bottom wall and a plurality of picker rolls 40 positioned across the opening 38 in the bottom wall and for controlling the flow of flakes out of the former 18, for breaking up any clumps of flakes, and for causing flakes emitted by the forming heads 18 to be uniformally dispersed across the conveyor belt surface 16. The picker rolls 40 each include a central rotatable shaft 42 and a plurality of pins or fingers which are integrally joined to the shaft 42 and which extend radially outwardly therefrom. Means are also provided for causing the central shafts 42 to be rotatably driven. As illustrated in FIG. 1, the spacing of the forming heads 18 along the length of the conveyor 14 causes the mat thickness to build up on a section of the conveyor as that portion of the conveyor passes under successive ones of the formers or forming heads 18.

The apparatus of the invention also provides a means for causing flakes which are deposited on the supporting surface 16 of the conveyor to be aligned in mutually parallel orientation as they fall onto the conveyor surface and to cause the flakes to remain in that mutually parallel orientation as they drop onto the conveyor and as additional flakes are deposited during build up of the mat 10.

The means for causing the flakes to be aligned includes a plurality of continuous strips or lengths of baffle material 50 positioned between the upper surface 16 of conveyor 14 and the forming heads 18, the lengths of baffle material 50 being oriented to define closely adjacent parallel vertical planes, the parallel planes being spaced apart by a distance somewhat greater than the width of the flakes being deposited by the forming heads. More particularly, it is important that the baffles are spaced apart by a distance sufficiently wide that all of the elongated flakes which are being deposited by the forming heads can fall between the baffles and with the flakes lying with their major planes in horizontal relation. On the other hand, the baffles 50 should be sufficiently close together that the flakes lying between the baffles 50 are aligned in substantially mutually parallel relation. While, for convenience of illustration, only ten lengths of baffle material 50 are shown in side-by-side parallel relation, it should be understood that the number of required lengths of baffle material 50 is dependent on the width of the composite wood product 32 to be formed.

The lengths or strips of baffle material 50 each have a lower edge which is adapted to engage or rest on the supporting surface 16 of the conveyor 14, and they have a vertical height intended to be approximately the same as the desired thickness of the mat 10. As set forth in the Lund et al. patent referred to above, if the resultant composite wood product is to have a thickness of approximately 1 inch, the loosely felted mat should have a thickness of approximately 5 to 6 inches.

In the preferred form of the invention, the continous lengths of baffle material 50 illustrated in the drawings are comprised of a material which is suitable to form an integral part of the compressed composite wood product 32. Examples of suitable materials for forming the baffles 50 can comprise continuous lengths of cheesecloth, wire mesh, paper, adhesive films, latent resin-coated paper, fiberglass fibers or an uncured resin carrier, or a latent adhesive bonding film comprised of urea, resorcinol, phenolic, epoxy, polyester or other sythetic material. The materials cited are merely illustrative of possible materials which could be used, and it will be understood by one skilled in the art that other flexible planar substrates which could form an integral part of the loosely felted mat 10 and ultimately a part of the compositee wood product 32, could also be employed.

Figure 2:
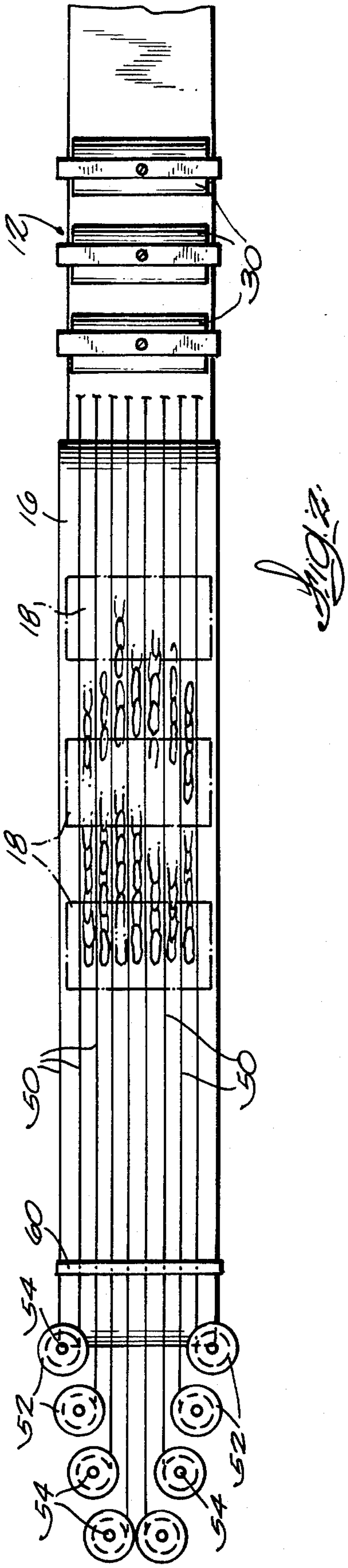
FIG. 2 is a partial plan view of the apparatus shown in FIG. 1.

Means are also provided for feeding continuous lengths of the baffle material 50. In the illustrated construction, the means for feeding the continuous lengths 50 includes a plurality of spools 52 which are spaced apart and positioned in the triangular arrangement illustrated in FIG. 2, the spools 52 being supported for rotation simultaneously about vertical axes and are spaced apart such that the baffle material 50 being fed by the spools 52 will be spaced apart and in generally parallel closely spaced relation. For example, the spools could be supported on a plurality of vertical shafts 54, the shafts 54 being positioned or aligned so as to lie in two vertically oriented planes being generally parallel to the sides of the conveyor but converging. While in the illustrated construction the planes defined by the shafts 54 supporting the spools 52 converge away from the direction of movement of the supporting surface 16 of the conveyor belt 14, in other arrangements, the planes defined by these shafts 54 could converge at a position closely adjacent the conveyor belt.

Means are also provided for supporting the baffles 50 in evenly spaced apart vertical relation. While various means could be provided, in the illustrated construction, such means include a vertically oriented plate 60 positioned transversely to the direction of movement of the supporting surface 16, the plate including a plurality of elongated narrow slots housing the baffles.

In operation of the invention, the forming heads 18 will drop a uniformly dispersed quantity of wood flakes onto to the upper edges of the baffles 50, and the flakes will tend to become aligned with the baffles 50 and fall between the baffles. Though many of the flakes deposited by the forming heads will be oriented transversely to the baffles 50, the movement of the baffles with the conveyor belt 14 will cause the flakes to become aligned with the planes of the baffles and to fall between the baffles. Since the individual continuous baffles 50 are spaced apart by a distance only slightly greater than the width of the flakes, the flakes falling between the baffles will be positioned substantially parallel to the planes defined by the baffles.

As the loosely felted mat 10 of material forms the desired thickness and moves past the forming heads 18, it can be fed continuously into the press apparatus 12 where the loosely felted mat 10 can be compressed by rollers 30 to form a compressed composite wood product 32. In some embodiments, the press apparatus can include a heat source in the event that heat is required to cure the binder. In the illustrated construction the press rollers 30 are spaced apart in the direction of movement of the mat 10 and adapted to compress the mat 10 as the mat moves beneath the rollers. Means are provided for generating a downward force on the rollers 30 and on the mat so as to cause the mat to be compressed as it moves beneath the rollers. The illustrated means for applying force on the rollers 30 comprises a plurality of hydraulic cylinders 31. As the mat 10 moves through the press 12, the thickness of the mat will decrease and the density of the mat will increase. While in the illustrated arrangement, the means for applying downward force on the rollers includes hydraulic cylinders 31, in other constructions alternative means could be employed for supporting the press rollers. It should be noted that the rollers 30 can be rotatably driven so as to pull the mat 10 and the continuous lengths of baffles 50 through the press apparatus 12. While the illustrated press apparatus comprises one possible means of compressing the loosely felted mat formed by the apparatus of the invention, other suitable and conventional press apparatus could be employed.

One of the principal features of the arrangement described herein is that the baffle material 50 maintains alignment of the elongated wood flakes as they are being deposited and as the mat 10 is being built up and while the mat is compressed, and the flakes are not permitted to seek a random orientation after becoming aligned. Accordingly, the compressed composite wood product 32 being formed will have a maximum strength in the direction of the longitudinal axis of the product since substantially all of the elongated wood flakes therein will be in mutually parallel orientation.

Various features of the invention are set forth in the following claims.

We claim:

1. Apparatus for forming a continuous loosely felted met of wood flakes adapted to be compressed and to form a composite wood sheet, the mat being elongated and including a longitudinal axis, and said wood flakes being elongated and being aligned in mutually parallel relation and parallel to the longitudinal axis of the continuous mat, the apparatus comprising:

a conveyor having an upper surface adapted to support a loosely felted mat of wood flakes thereon, and means for causing continuous movement of said conveyor as said loosely felted mat is formed, means for continuously depositing wood flakes on said upper surface such that said wood flakes are built up on the upper surface to form an elongated continuous loosely felted mat, and flake alignment means for causing said wood flakes deposited on said upper surface to assume an orientation parallel to the direction of movement of said conveyor and to maintain said parallel orientatin as said mat thickness increases, said flake alignment means including means defining a plurality of elongated lengths of baffle material, said elongated lengths of baffle material being oriented so as to define parallel adjacent vertical planes, said planes being parallel to the direction of movement of said upper surface, each length of baffle material including a lower edge adapted to be positioned immediately adjacent said upper surface of said conveyor, said lengths of baffle material being positioned in closely spaced side-by-side relation, said baffle material being adapted to be supported in rolls and being adapted to be supported such that the baffle material can unroll and move continuously with said upper surface of said conveyor in the direction of movement of said upper surface of said conveyor beneath said means for depositing as said loosely felted matter is formed, and said baffle material being adapted to be compressed with said loosely felted mat to form a composite wood sheet, means for feeding a plurality of elongated lengths of baffle material onto said conveyor, said means for feeding including means for supporting said elongated lengths of baffle material in closely adjacent parallel vertical planes, and means for compressing said lengths of baffle material and said loosely felted mat.

2. Apparatus as set forth in claim 1 wherein said means for supporting said elongated lengths of baffle material includes a plurality of spools, each of said spools supporting an elongated length of baffle mateial, and means for supporting said spools for rotation about a vertical axis such that the spools will feed lengths of baffle material onto said conveyor.

3. A method for compressing a continuous loosely felted mat of wood flakes into a composite wood sheet, the mat being elongated and including a longitudinal axis, and the wood flakes being elongated and being aligned in mutually parallel relation and parallel to the longitudinal axis of the continuous mat, the method comprising the steps of:

providing a conveyor having an upper surface adapted to support a loosely felted mat of wood flakes thereon, and means for causing continuous movement of the conveyor as the loosely felted mat is formed.

depositing wood flakes on the upper surface of the conveyor such that the wood flakes are built up on the upper surface to form an elongated continuous loosely felted mat, providing a plurality of elongated lengths of baffle material for causing the wood flakes deposited on the upper surface of the conveyor to assume an orientation parallel to the direction of movement of the conveyor and for maintaining the parallel orientation of the wood flakes as the mat thickness increases, the elongated lengths of baffle material being oriented so as to define parallel adjacent vertical planes parallel to the direction of movement of the upper surface of the conveyor, the lengths of baffle material being positioned in closely spaced side-by-side parallel relation and being supported so as to move continuously and in one direction with the upper surface of the conveyor as the loosely felted mat is formed, with each length of baffle material including a lower edge positioned immediately adjacent the upper surface of the conveyor, and compressing the loosely felted mat of wood flakes and the baffle material to form a composite wood sheet.

* * * * *